United States Patent
Uchida

[11] Patent Number: 6,155,374
[45] Date of Patent: Dec. 5, 2000

[54] ENGINE EXHAUST CONTROL

[75] Inventor: Yoshiaki Uchida, Iwata, Japan

[73] Assignee: Yamaha Hatsudoki Kabushiki Kaisha, Shizuoka-ken, Japan

[21] Appl. No.: 09/213,601

[22] Filed: Dec. 17, 1998

[30] Foreign Application Priority Data

Dec. 17, 1997 [JP] Japan .................................... 9-347567

[51] Int. Cl.$^7$ .................................................. B60K 13/04
[52] U.S. Cl. .......................................... 180/309; 180/68.3
[58] Field of Search .................................. 180/309, 68.3

[56] References Cited

U.S. PATENT DOCUMENTS

| | | | |
|---|---|---|---|
| 4,285,311 | 8/1981 | Iio | 123/323 |
| 4,364,346 | 12/1982 | Shiohara | 123/323 |
| 4,388,894 | 6/1983 | Tanaka et al. | 123/65 PE |
| 4,397,272 | 8/1983 | Omote | 123/179 A |
| 4,986,780 | 1/1991 | Sougawa | 440/89 |
| 4,998,512 | 3/1991 | Masuda et al. | 123/65 PE |
| 5,000,131 | 3/1991 | Masuda | 123/65 PE |
| 5,183,013 | 2/1993 | Ito et al. | 123/48 R |
| 5,190,006 | 3/1993 | Motoyama et al. | 123/65 PE |
| 5,220,890 | 6/1993 | Koriyama | 123/65 PE |
| 5,322,044 | 6/1994 | Maebashi | 123/305 |
| 5,400,755 | 3/1995 | Maebashi | 123/332 |
| 5,410,993 | 5/1995 | Masuda et al. | 123/65 PE |
| 5,575,246 | 11/1996 | Ito | 123/65 PE |
| 5,715,794 | 2/1998 | Nakamura et al. | 123/425 |
| 5,782,214 | 7/1998 | Nanami et al. | 123/65 PE |
| 5,827,096 | 10/1998 | Mineo | 440/89 |
| 5,878,702 | 3/1999 | Motoyama et al. | 123/65 PE |

*Primary Examiner*—J. J. Swann
*Assistant Examiner*—L. Lum
*Attorney, Agent, or Firm*—Knobbe, Martens, Olson & Bear LLP

[57] ABSTRACT

A snowmobile is powered by an internal combustion engine. The engine has an exhaust timing control valve, a control unit and a generator. The control unit determines the positioning of the control valve as a function of engine speed. Additionally, the control unit initiates a control valve cleaning cycle when the engine speed first exceeds a first predetermined speed within a predetermined range of engine speeds. The first predetermined speed is desirably an engine speed at which the generator generates sufficient power to render the control unit operable. The control unit retracts the control valve when the engine speed exceeds the upper limit of the predetermined range. Thereafter, the control unit initiates another control valve cleaning cycle when the engine speed decreases below a second predetermined engine speed.

13 Claims, 5 Drawing Sheets

ENGINE EXHAUST CONTROL

BACKGROUND OF THE INVENTION

1. Field of the Invention

The present invention relates to an exhaust timing control system and control unit. More particularly, the present invention relates to an exhaust timing control system and control unit of a snowmobile.

2. Description of Related Art

Snowmobiles are powered by internal combustion engines, particularly two stroke engines. Additionally, small snowmobiles do not have batteries to power electrical accessories when the engine is not operating; such accessories are powered by a generator when the snowmobile engine has been started. Larger snowmobiles may have batteries; however, due to the unusually cold operating environments that these vehicles are subjected to, the batteries may store and retain little power.

The conventional two stroke engines which power snowmobiles generally include an exhaust port provided in each cylinder wall such that spent gases are exhausted through the exhaust port as the piston reciprocates in the cylinder. Exhaust port timing has an important effect on engine performance. Optimum exhaust port timing is dependent, in part, upon engine speed. For instance, to provide an improved engine performance, the exhaust port timing can be advanced during high-speed engine operation relative to the exhaust port timing during engine idling.

One manner of controlling the exhaust port timing is to employ exhaust control valves. Generally, these valves are of the sliding or rotating type, and do not serve to ever completely close the opening or port in each combustion chamber. Instead, each valve moves between a first position, in which the valve does not obstruct, or obstructs very little of, the exhaust port, and a second position, in which the valve partially obstructs the port. Therefore, the exhaust control valve can alter the effective cross-sectional area of the exhaust port by appearing to lower an upper surface of the exhaust port, thereby restricting the flow through the exhaust port.

Because these valves have a relatively small range of movement, and are not continuously moved, they may seize within the guide passage in which they are mounted. Such seizure may result due to deposits that form on the valve bodies. Specifically, because these valves are normally employed in two cycle engines and because oil is typically mixed with the air and fuel charge ported into the combustion chamber, the oil can cause a further problem once the engine is shut off. While the engine is running, the engine temperature will be high enough to avoid any carbonization of the oil byproducts on the valves. However, as a stopped engine cools, residual oil may carbonize, or coke, on the control valves and form deposits which, along with other foreign matter, will make it difficult to operate the valves when the engine is later restarted. In short, these deposits will tend to inhibit smooth operation of the valves. Of course, the aforementioned temperature differences will also further aggravate this situation.

In the past, it has been suggested to exercise the exhaust control valve through a number of cycles between an opened and a closed position to clean any scale, carbon deposits or other debris from the exhaust control valve. In vehicles having sufficient battery power, the control valves are cycled through a cleaning operation under power from the battery before the engine is started. However, in a vehicle such as a snowmobile, which does not have a battery, a cleaning operation may not occur prior to starting.

Additionally, movement of the exhaust control valves typically alters engine performance characteristics such that efficiencies may be obtained at a lower engine speed range without significantly harming engine performance at a higher engine speed range. For instance, closing the exhaust control valves delays the timing of the exhaust cycle such that the compression ratio is increased. This increase enhances low speed engine performance. Again, due to the cold environment in which snowmobiles are used, the cold starting temperature of the engine typically causes difficulties when starting the engine. Moreover, the cold temperature can result in rough idling and rough engine running at low speed.

SUMMARY OF THE INVENTION

One aspect of the present invention recognizes that maintaining the exhaust control valve in an open position during shutdown affords some advantages in cold environment vehicles. For instance, opening the valves by retracting them offers a final cleaning operation to remove deposits that may later coke on the valve bodies. Accordingly, the valves a less likely to stick on a subsequent restart if the valves are cycled to an open position on shutdown in vehicles not have a battery to power the valves in a cleaning cycle prior to such a subsequent restart.

Accordingly, it is desired to have a snowmobile having an exhaust control valve control which performs a cleaning operation upon shutdown under the power of an electrical generator and which returns the valves to an open or retracted position upon engine shutdown. Additionally, it is desired to have a snowmobile which employs a mapped positioning control of the exhaust control valves such that engine performance can be enhanced at a low end while substantially maintaining high end good high end performance.

In accordance with the present invention, there is provided a snowmobile comprising an engine driving a track. The engine having a crankshaft and a combustion chamber. An exhaust port leading from the combustion chamber for routing exhaust products therefrom and an exhaust valve cooperable with the exhaust port. The exhaust valve being movable between a first position for delaying the closing of the exhaust port and a second position for advancing the closing of the exhaust port. The snowmobile further comprising an electrical power source that generates power through a connection to the engine crankshaft, a control unit powered by the electrical power source and a drive control in communication with the control unit. The drive control being capable of moving the exhaust valve at least partially between the first position and the second position. The control unit signaling the drive control to extend the valve from the first position to the second position if the engine has an engine speed within a predetermined range. The control unit signaling the drive control to retract the valve from the second position to the first position if the engine speed is outside of the predetermined range, wherein the predetermined range has a lower limit engine speed below which the electrical power source cannot generate sufficient energy the supply to power control unit.

Another aspect of the present invention involves a snowmobile comprising an engine driving a track. The engine has an output shaft, a combustion chamber, and an exhaust port leading from the combustion chamber for routing exhaust products therefrom. An exhaust valve is cooperable with the exhaust port and is movable between a first position for delaying the closing of the exhaust portion and a second position for advancing the closing of the exhaust port. The engine further comprises an electrical power generator that is connected to the output shaft to generate electrical energy. The snowmobile also has a control unit and a drive control in electrical communication with the control unit. The drive control and the control unit receive power from the electrical power generator. The drive control is capable of moving the exhaust valve at least partially between the first position and the second position. The control unit activates the drive control to cycle the exhaust valve between the first position and the second position in a cleaning operation before the engine attains a first predetermined speed, wherein the first predetermined speed is below an idle speed.

Yet another aspect of the present invention involves a method of conducting an exhaust timing control valve cleaning operation. The method comprises sensing an engine speed with an engine speed sensor and inputting the engine speed into a control unit. The engine speed is compared with a first predetermined engine speed. A first cleaning operation is conducted when the engine speed first exceeds the first predetermined engine speed following start-up. The engine speed is continued to be monitored and a second cleaning operation is conducted when the engine speed has exceeded a second predetermined engine speed and subsequently fallen below a third engine predetermined speed.

A further aspect of the present invention involves a method of operating an exhaust timing control valve control. The method comprises sensing an engine start-up and sensing an actual engine speed. The actual engine speed is compared to a first predetermined engine speed at which an electrical power generator is operable. An exhaust valve is closed according to a mapped strategy when the actual engine speed exceeds the first predetermined speed. The actual engine speed is compared to a second predetermined engine speed which is approximately an idle speed and a first exhaust valve cleaning operation is initiated when the actual engine speed first exceeds the second predetermined engine speed following engine start-up. The actual engine speed is then compared to a third predetermined engine speed that is approximately a speed at which it is desirable to open the exhaust valve. The exhaust valve is opened according to a mapped strategy when the actual engine speed exceeds the third predetermined engine speed. The actual engine speed is compared to a fourth predetermined engine speed that is above the second predetermined engine speed and below the third predetermined engine speed. A second exhaust valve cleaning operation is initiated when the actual engine speed decreases from at least the third predetermined engine speed to below the fourth predetermined engine speed. The actual engine speed is compared to a fifth predetermined engine speed that indicates an engine shutdown is occurring and the exhaust valve is opened when the actual engine speed decreases below the fifth predetermined engine speed.

BRIEF DESCRIPTION OF THE DRAWINGS

Further aspects, features and advantages of the present invention will become apparent from the detailed description of a presently preferred embodiment. The illustrated embodiment is intended to illustrate, but not to limit, the present invention. The drawings contain the following figures.

DETAILED DESCRIPTION OF THE PREFERRED EMBODIMENTS OF THE INVENTION

The present exhaust timing control system and control unit have particular utility with snowmobiles, and thus, the following describes such a system and unit in the context of an exemplary snowmobile. This environment of use, however, should be considered exemplary. The present exhaust timing control system and control unit can be readily adapted by those of skill in the art for use with other types of vehicles as well, such as tracked vehicles used extensively in cold temperature climates.

Figure 1:
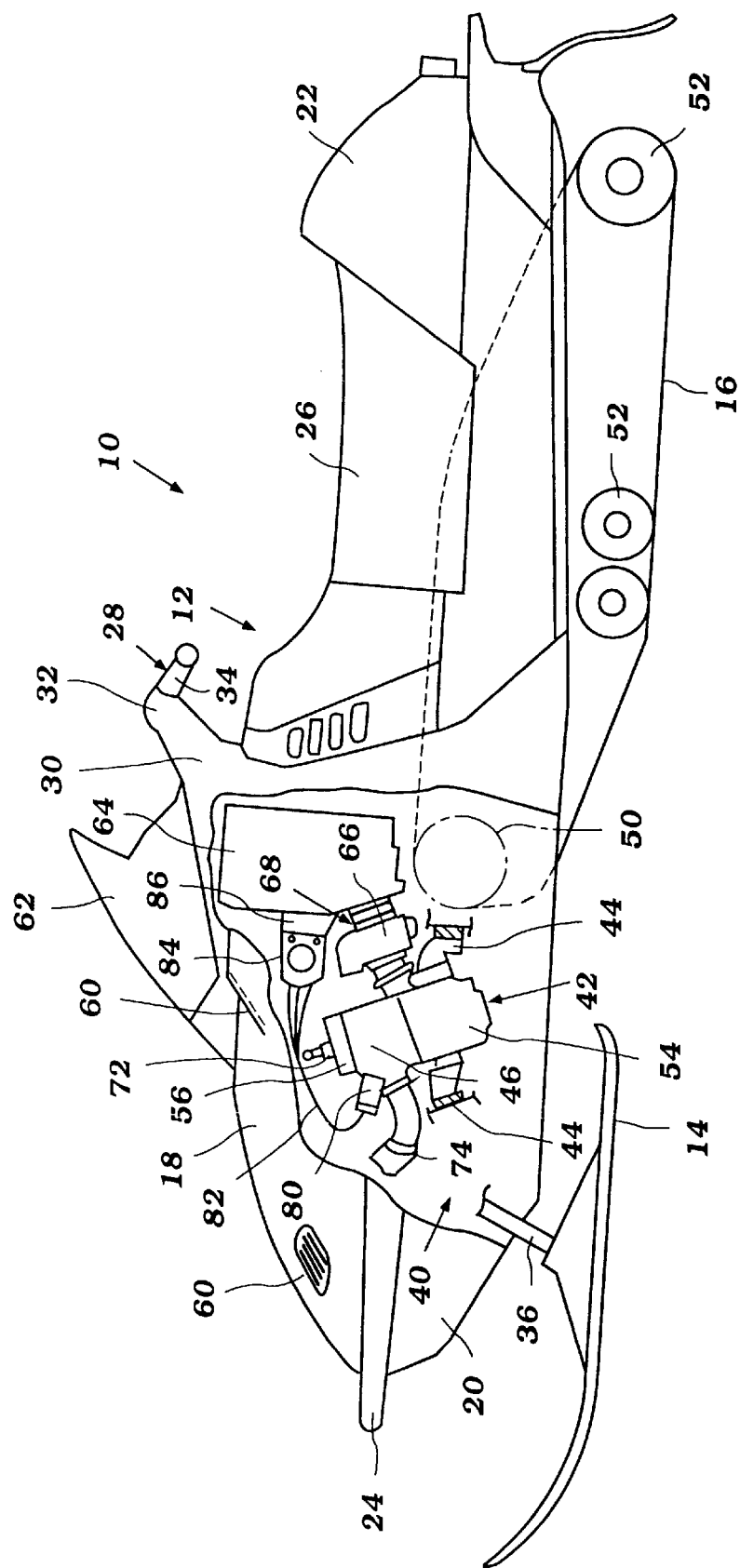
FIG. 1 is a partially sectioned side view of an exemplary snowmobile having a broken out region illustrating certain internal components.

With reference now to FIG. 1, an exemplary snowmobile, indicated generally by the reference numeral 10, will be introduced to provide an environmental framework within which the present invention will be described. The snowmobile 10 generally comprises a body 12 that is supported at a forward portion by a pair of skis 14 and is driven from a rear portion by a track 16. The body 12 may be of any known construction and when it is referred to herein as a "body", it is to be understood that this term is intended to encompass a frame, or the elements of the body itself, such as, for example, but without limitation, body panels. The body 12 generally includes a front shroud 18, a belly pan 20 and a rear cover 22. The front shroud 18 and the belly pan 20 may be joined about a bonding flange 24 as is known by those of skill in the art.

A longitudinally extending straddle-type seat is positioned forward of the rear cover 22. The seat extends forward from the rear cover 22 toward a steering mechanism 28. The steering mechanism includes a steering stem 30, steering handle 32 and a throttle control 34. The steering stem 30 may be mechanically linked in any suitable manner to the front skis 14. Desirably, movement of the steering handle 32 turns a steering shaft 36. The movement of the steering shaft 36 results in corresponding movement of the front skis 14 as is known.

An engine compartment 40 is defined within the front portion of the body 12 and is encased by the front shroud 18 and the belly pan 20. An engine 42 is mounted within the engine compartment in a known manner. For instance, a plurality of resilient engine mounts 44 may be used to connect engine plates to mounting bosses of a frame (not shown). The engine mounts desirably absorb engine vibrations such that they are reduced when transferred to the snowmobile 10 and jolts and shocks incurred by the snowmobile while riding on rough terrain such that the engine 42 and its components may be somewhat protection from the same.

The engine 42 may be any of a number of configurations. For instance, the illustrated embodiment is a three-cylinder application; however, other applications may utilize as few as one cylinder or more than three cylinders. Additionally, the engine may operate on any known cycle, such as, for example, but without limitation, a two-stroke, four-stroke, or rotary cycle. The present invention is described in the context of a three-cylinder engine operating on a two-stroke crankcase compression principal.

The illustrated engine 42 is generally comprised of a cylinder block 46 having three cylinder bores 48. As will be recognized, each cylinder bore may have a cylinder liner (not shown). A piston (not shown) is arranged to reciprocate within the bore as is known. The piston is connected to a crankshaft (not shown) with a connecting rod (not shown). The linear motion of the piston is translated into rotational motion of the crankshaft in a known manner. The crankshaft (not shown), in turn, powers a drive wheel 50 through a suitable transmission. The drive wheel 50 transfers its rotational movement to the track 16 that is tensioned by driven wheels 52 as is well known.

The crankshaft (not shown) is constrained for rotational movement within a crankcase 54 in a known manner. The crankcase 54 is secured to a lower surface of the cylinder block 46 and is sealed thereto by a gasket (not shown).

A cylinder head 56 is coupled to the cylinder block 46 at an upper surface of the cylinder block 46 and defines, in cooperation with the cylinder bore 48 and a top surface of the piston (not shown) a combustion chamber 58.

Fresh air is provided to the engine compartment 40 through at least one air vent 60. Desirably, at least two sets of air vents are present. The first set of vents are on a lower portion of the front shroud 18. The second set of vents are closer to a visor 62 of the snowmobile and are arranged to be substantially forward facing.

The fresh air delivered to the engine compartment 40 through the vents 60 is drawn into an air box 64 of an intake system. The air box 64 is arranged just forward of a front end of the seat 26 within the engine compartment 40. In this position, air flowing into the engine compartment may be slightly preheated by the engine 42 due to the engine being interposed between the air box 64 and at least one set of the vents 60.

The air from the air box 64 is passed to a carburetor 66 via an intake passage 68. Within the carburetor 66, the air picks up a fuel charge from a venturi or the like. Alternatively, the engine may have direct or indirect fuel injection, in which case, the air will pick up a fuel charge from the injectors at a desired location point within the intake system.

Figure 2:
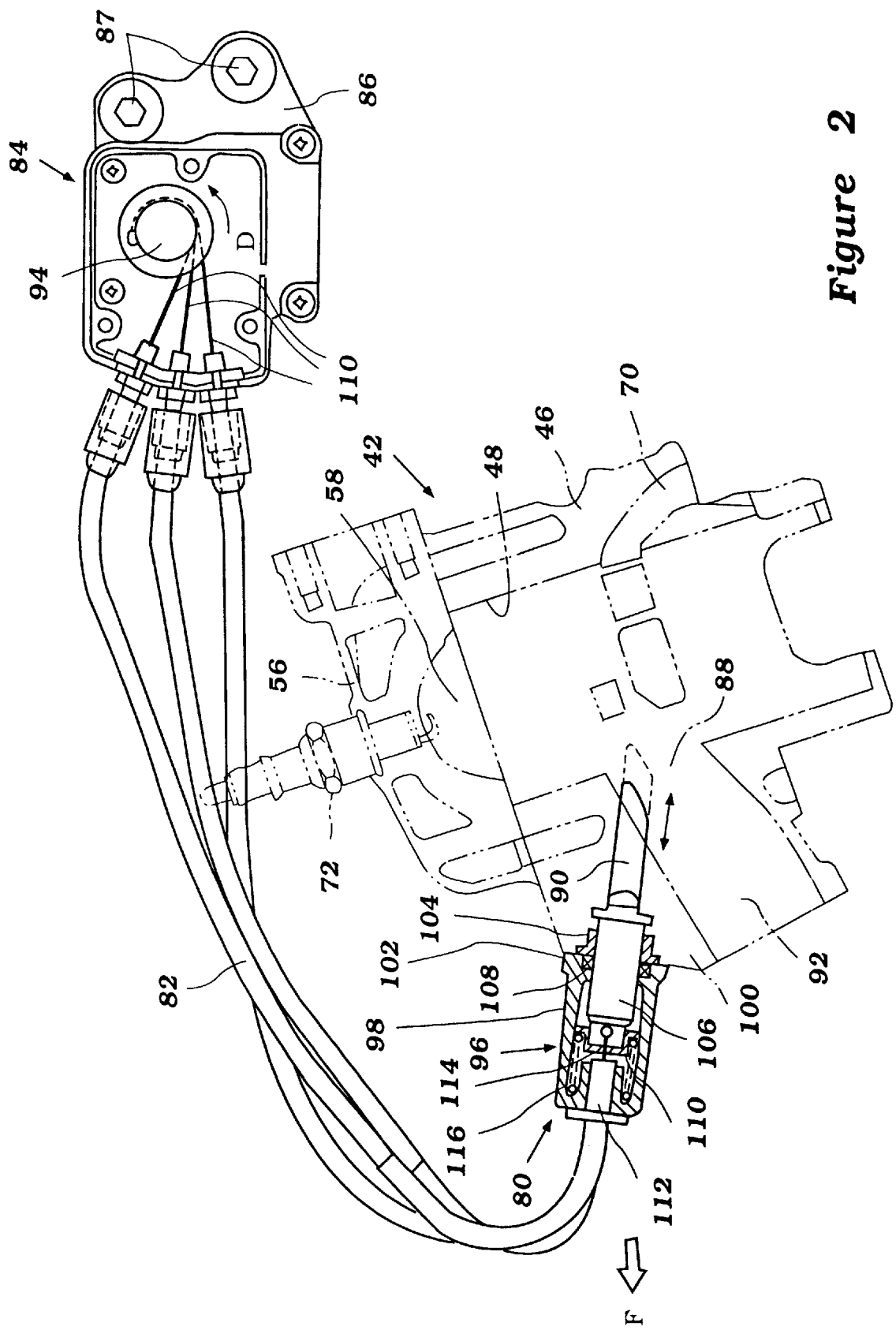
FIG. 2 is a partially sectioned side view of an exemplary exhaust timing control valve control mechanism with a portion of an engine illustrated in phantom line.
Figure 3:
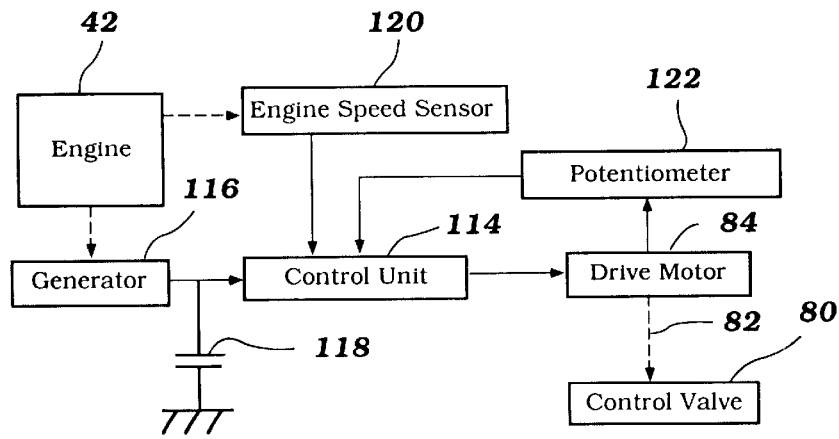
FIG. 3 is a schematic diagram of an exhaust timing control valve control system having features and aspects in accordance with the present invention.

The air and fuel charge is delivered to cylinder bore 48 via the crankcase 54 in the illustrated embodiment. With reference to FIG. 2, the air and fuel charge passes into the combustion chamber 58 through a plurality of scavenge passages in a known manner.

Once in the combustion chamber 58, the air and fuel charge may be ignited by a suitable ignition system. In the illustrated embodiment, the ignition system comprises a spark element 72 which is positioned such that its electrode extends downward through the cylinder head 56 into the combustion chamber 58. The ignition system also desirably includes a flywheel magneto and a set of pulsar coils that may be configured in a known manner to control ignition timing.

In applications utilizing a battery and a starter system, the flywheel magneto may also be provide with a starter ring which may engage with a starter motor as is known. The starter motor provides a rotation of the crankshaft of sufficient velocity to initiate combustion as described below and allow the engine to begin operation under its own power. The starter motor is then disengaged.

Following combustion, the spent gases are exhausted to the atmosphere through a suitable exhaust system 74. The exhaust system 74 of the illustrated embodiment transfers the exhaust products forward and out to the side of the snowmobile 20; however, the exhaust products may also be discharged to the rear of the snowmobile as well.

The above-described snowmobile is considered exemplary and well known to those of skill in the art. Accordingly, any omitted details are believed to be well known and within the knowledge of those having ordinary skill in the art.

With reference now to FIGS. 1 and 2, the structure of an exhaust control system being arranged and configured in accordance with the present invention will be described. Generally, the exhaust control system is comprised of a sliding knife-type valve 80 that is connected via control cables 82 to a motive member 84. It is also anticipated that rotating-type valves may also be used. In the illustrated embodiment, the motive member 84 is secured to a stay 86 that is itself secured to the air box 64 with a plurality of threaded fasteners 87.

The valve 80 controls the timing of the flow of exhaust gases through an exhaust discharge port 88 leading from the cylinder bore 48. As will be recognized, in applications having more than one cylinder, a valve may correspond to each discharge port such that the timing of the flow of exhaust gases through each exhaust passage may be controlled either separately or together.

As illustrated in FIG. 2, the valve 80 has a generally flat or plate-like body 90 having a first end positioned in a passage 92 proximate the exhaust port 88. The valve 80 is arranged to move between a retracted position in which the valve 80 does not generally obscure the port 88, and an extended position in which the valve 80 obscures a portion of the port 88. When in its retracted position, the valve 80 may be said to be in an "advancing" position since the timing of the flow of exhaust from the cylinder occurs soon as the piston moves downwardly in the cylinder. On the other hand, when in the extended position, the valve 80 may be said to be in a "retarding" position, since the flow of exhaust from the cylinder is delayed since the piston must move farther down the cylinder before the port 88 to the passage 92 is opened.

While a variety of control strategies may be employed, the exhaust valve 80 may be positioned in its extended position when the engine speed is low, in the retracted position when the engine speed is high, and in some position between the retracted and extended positions at engine speeds between the low and high speeds.

The valve 80 is moved by the motive member 84. In the illustrated embodiment, the motive member 84 is an electrically powered stepper-type motor. As will be recognized by those of skill in the art, other types of motors may also be used. The motor 84 has a drive spool 94 that is adapted to be driven in a counterclockwise direction and braking elements which stop the rotation of the drive spool to reduce or eliminate coasting between movements. As will be recognized by those of skill in the art, the drive spool 94 may also be driven in a clockwise direction.

In the illustrated embodiment, the valve 80 is provided with a biasing mechanism 96. Accordingly, the motor 84 is arranged to counteract the biasing mechanism 96 and move the valve 80 into a variety of positions between its fully retracted and fully extended positions. The biasing member can either remove slack created when the motor is reversed or can move the spring when the motor and braking elements are relaxed. Thus, the motor may allow movement when the electrical energy source is removed or may maintain its position unless a braking element is disengaged.

With continued reference to FIG. 2, the biasing mechanism will be described in detail. The illustrated biasing mechanism 96 is arranged within a valve housing 98. The housing desirably extends outward from a thick sidewall 100 of the cylinder block 46, through which wall 100 the valve 80 is arranged to translate. The housing 98 is secured to the cylinder block in a known manner with a gasket 102 sealing the connection location. In the illustrated embodiment, a collar 104 is removably received by a receptacle formed in the thick sidewall 100 such that the collar 104 holds the valve 80 and the housing 98 in position. For instance, the collar may have external threads that mate with internal threads within the receptacle.

A shaft portion 106 of the exhaust timing control valve 80, which portion is at the proximal end of the valve body 90, extends into a chamber formed within the housing 98. The shaft portion 106 and the chamber within the housing 98 are desirably configured to allow relatively free movement of the shaft portion 106 within the housing 98. The chamber is sealed from foreign particles and debris with an oil seal 108. Thus, the influx of foreign particles and debris is reduced and the integrity of the chamber is somewhat protected from such elements.

The proximal end of the shaft portion 106 is adapted to receive a distal end of one of the three operation cables 82. In the illustrated embodiment, the cables 82 are of the Bowden-wire type, which have a thin wire 110 extending through a cable sleeve 112. The wire 110 is capable of easy movement within the sleeve and the sleeve helps reduce the likelihood of the wire freezing in a single position. The wire portion 110 of the cables 82 may be connected to the proximal end of the shaft portion 106 of the exhaust control valve 80 in any suitable manner.

The proximal end of the shaft portion 106 also has a biasing member support bracket 114. The illustrated support bracket 114 has an outward extending ring flange adapted to support or hold a biasing member such as a compression spring 116. The compression spring 116 is positioned within a proximal end of the chamber between the proximal end wall of the chamber (through which the wire 110 extends) and the support bracket 114. Thus, as the wire 110 pulls on the proximal end of the shaft portion 106 of the valve 80, the spring will be compressed. Accordingly, retracting the exhaust timing control valve compresses the spring.

As introduced above, the wire of the cable 82 has a distal end that is connected to the exhaust timing control valve 80. The proximal end of the wire of the cable 82 is wrapped about the spool 94 of the motor 84. Thus, the rotation of the spool 94 in a counterclockwise direction pulls the wire 110 through the sleeve 112 of the cable 82. Pulling the wire 110 retracts the valve 80 and compresses the spring 116. When the motive force of the motor 84 is removed and the brakes on the motor are released, the spring 116 urges the valve 80 back into its extended position.

While the above-described embodiment utilizes a stepper motor 84, it is also contemplated that other arrangements may be used which allow the motive member 84 to power the valve between one or both positions. For instance, a pin and yoke configuration may allow the clockwise rotation of a drive element to extend the valve while a counterclockwise rotation of a drive element may retract the valve. Other configurations will also be readily apparent to those of skill in the art.

In accordance with the present invention, an exhaust timing valve control unit 114 is provided for controlling the movement of the valve 80 via the motor 84 or other valve-driving mechanism. Preferably, this control unit 114 is arranged to control the movement of the valve 80 based, in part, on the speed of the engine 42 as detected from either a known pulsar coil arrangement or a generator 116 associated with the engine 42, as described in more detail below. The control unit may cycle the valves through a cleaning operation in which the valve is moved between an open or retracted position and a closed or extended position. The valve may be moved in a back and forth manner for several movements or may be cycled only once; however, the cycling allows deposits to be removed by a scraping edge of the passage in which the valve reciprocates, for instance.

Figure 5A:
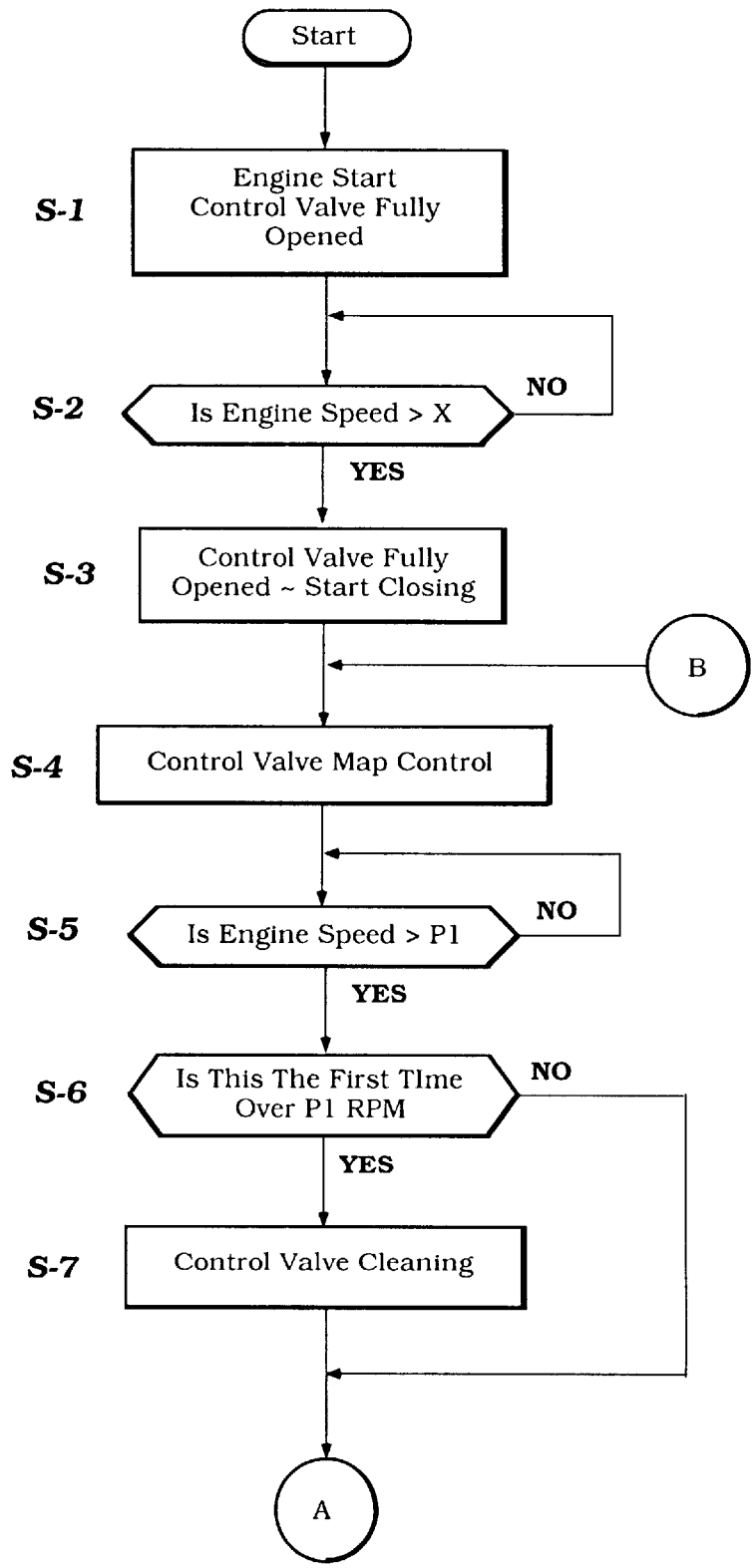
FIGS. 5A and 5B are a flow diagram of a preferred control routine having features and aspects in accordance with the present invention.

With reference to FIG. 5A, once the engine 42 has been started, the engine 42 powers the generator 116. As is known, the generator creates sufficient power to supply to various electrical components only when the engine achieves a predetermined engine speed. For instance, in the illustrated embodiment, the engine must be turning an output shaft at about 700 RPM for the generator to produce adequate electricity for the electrical system of the snowmobile. The power from the generator 116 is rectified into a DC current by a rectifier. The power from the generator as rectified is used to power the various electrically operated engine features, including the exhaust timing valve control unit 114 and the drive motor 84. As will be recognized, in applications employing a battery and a starter motor, the generator may also charge the battery.

In the illustrated embodiment, because no battery is utilized, a portion of the power from the generator 116 is stored in a condenser 118 such that, upon engine shutdown, enough electrical power remains to finish an exhaust timing control valve control cycle. As will also be appreciated, power may be drawn from the battery to accomplish the same result.

The power from the generator is used, in part to operate the control unit 114. The control unit 114, as will be described in detail below, coordinates the movement of the exhaust timing control valves 80 by assimilating data indicative of the operating condition of the engine 42. In the illustrated embodiment, the data assimilated the engine speed and valve positioning. The control unit 114 may signal the drive motor 84 to positively move the valves 80 in a manner described above or to allow the biasing force of the spring to take over as desired. The control signals may require partial movement or may require a complete cycling of the exhaust timing control valve from an extended position to a retracted position or vice versa.

In the illustrated embodiment, the control unit 114 samples data provided by an engine speed sensor 120 and a potentiometer to determine the desired and actual positioning of the exhaust timing control valve 114. The engine speed sensor 120 presents information related to the engine speed in a known manner. The engine speed sensor may obtain its data from generator output or actual engine speed. This speed data is used to determine when to move the valves 80, how much to move them and in which direction. The potentiometer 122 provides data related to the current position of the valve 80 in a known manner. Thus, by comparing the engine speed output from the sensor 120 to a map of speed and position arrays, a desired positioning for the instant speed reading can be determined. By sampling the data from the potentiometer, the actual positioning of the valves 80 can be deduced. The necessary movement can then be determined and initiated by the control unit 114.

Figure 4:
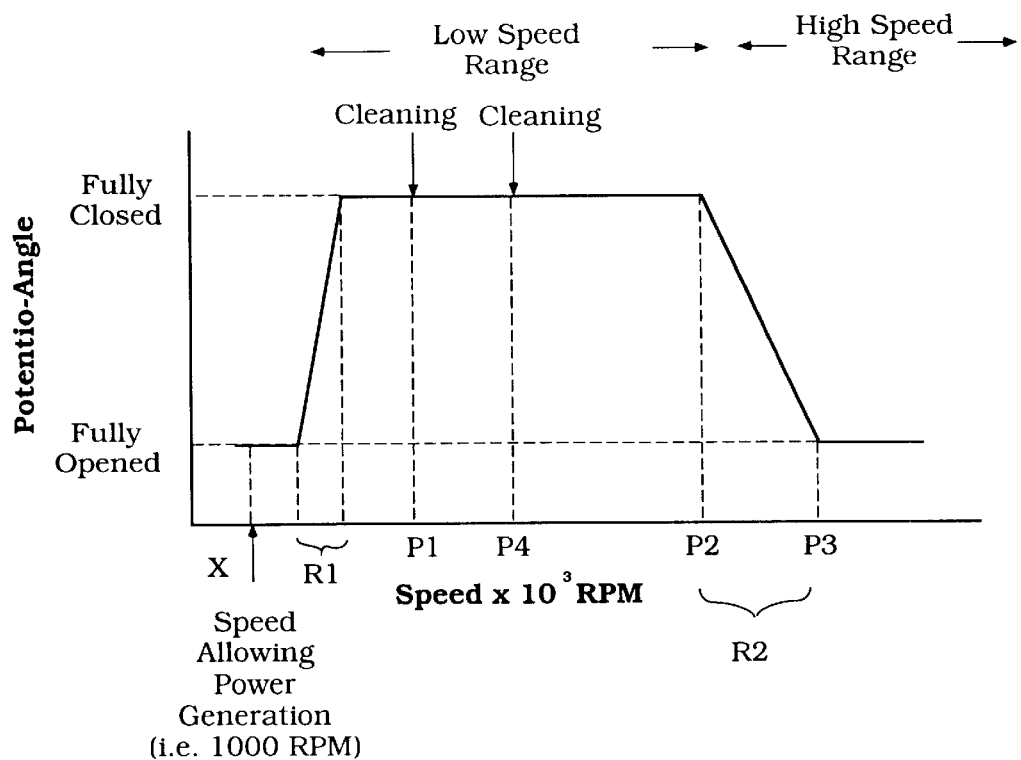
FIG. 4 is a graphic depiction of exhaust timing control valve positioning relative to actual engine speed for a control system having features and aspects in accordance with the present invention.
Figure 5B:
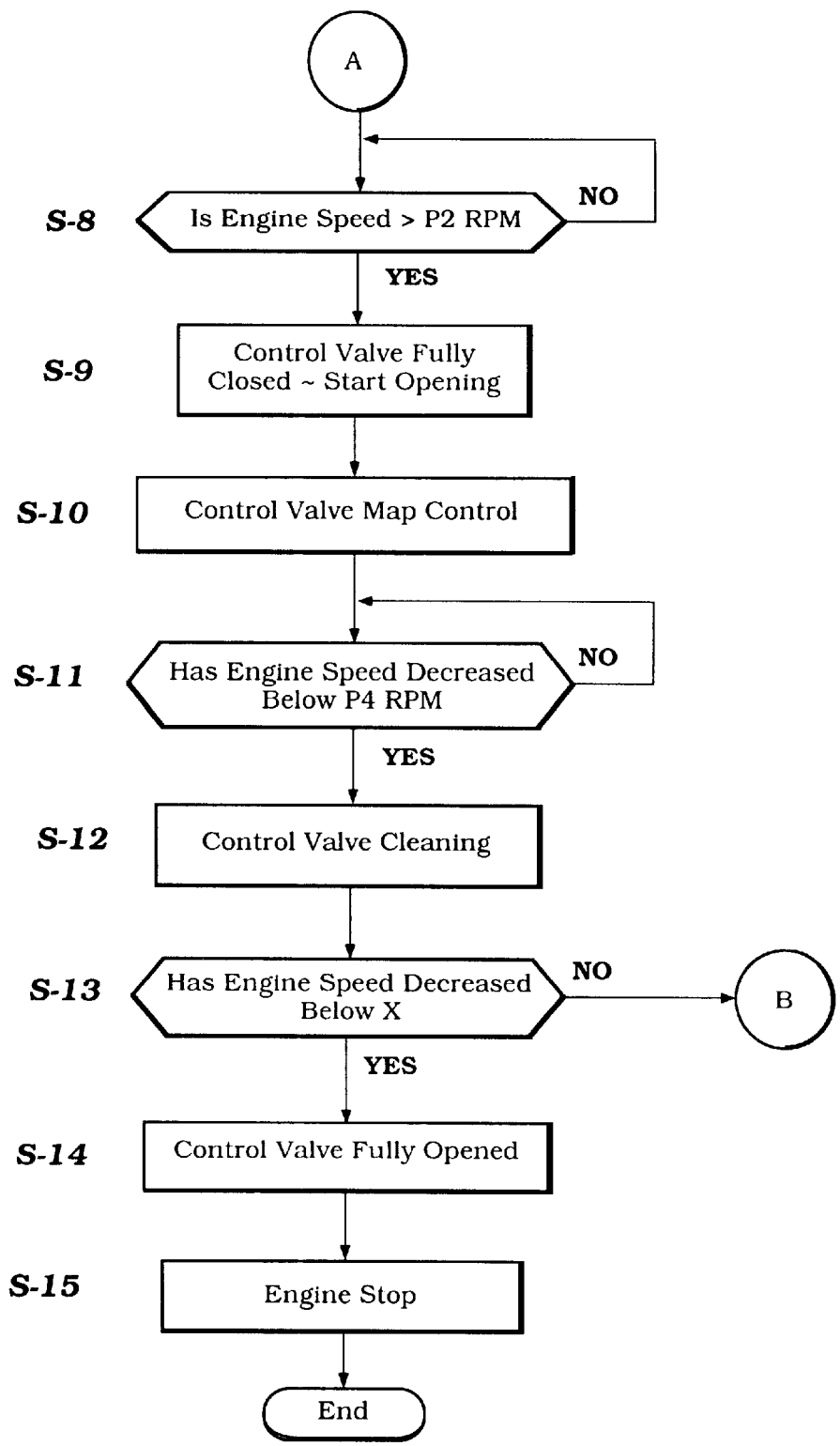

With reference now to FIGS. 4–5B, a control sequence will be introduced. The control sequence may be stored as a program within a memory portion of the control unit 114 or another CPU that interacts with the control unit 114. The control unit 114 may be arranged so that after the start switch 118 or other on/off switch is operated, or the generator begins producing power, and power is provided (as described in more detail below) to the control unit 114 (step S1), the control unit 114 checks the engine speed.

Prior to control by the control unit 114, the control valve 80 is desirably maintained in a retracted or substantially retracted position. Once the engine speed exceeds a predetermined speed X, the control unit receives adequate power from the generator to render the control unit operable. This predetermined speed is approximately 700 rpm in the illustrated embodiment; however, the speed is dependent upon the application.

Once the first predetermined speed X is exceeded and the control unit is powered up, the control unit 114 may move the valve 80 to its fully extended position (S-3). The closing of the control valves 80 is desirably accomplished with reference to a map of desired positions (S-4). The mapped strategy reflects desired valve positions as a function of engine speed. With reference to FIG. 4, the closing of the control valves 80 occurs over a range of engine speed R1 such that the valve positioning complements the desired performance characteristics of the engine 42. The range in the illustrated embodiment comprises about 1,000 RPM to about 1,100 RPM. The extending of the valve may be considered a cleaning operation. Idle speed for the illustrated embodiment may be between 1,600 and 1,950 RPM.

The control unit 114 continues to sample the engine speed after an idle speed is obtained such that when the engine speed exceeds a first predetermined engine speed P1 for a first time, the exhaust control valve 80 may be cleaned. As is known, scale may build-up on the control valve 80 over time. By rapidly cycling the exhaust timing control valve between an extended position and a retracted position, the exhaust timing control valve surfaces may be cleared of a substantial portion of such build-up. However, such cycling alters the compression ratio and, thus, may ultimately affect engine performance. Thus, in the illustrated embodiment, the control unit 114 waits until the engine speed exceeds about 2,500 RPM for the first time (S-5, S-6) and then performs a cleaning function (S-7). By only cleaning the valves at this speed threshold during initial acceleration, any adverse effects on engine performance that may result from the varied compression ratio may be limited to start-up accelerations.

With reference now to FIG. 5B, the control unit 114 continues to sample the engine speed through the engine speed sensor 120 following the cleaning cycle. When the engine speed exceeds a second predetermined engine speed P2, which is about 6,000 RPM in the illustrated embodiment, the control unit 114 initiates a high-speed conversion. The high-speed conversion retracts the control valve 80 to allow better performance at a top end of the engine speed profile. Thus, upon detecting a high speed indicating engine speed (S-8), the fully extended exhaust timing control valve is retracted according to a mapped strategy in which valve position is a function of engine speed (S-9, S-10). This retracting of the valve desirably occurs within a second range R2 of engine speeds defined by the second predetermined engine speed P2 and the third predetermined engine speed P3. In the illustrated embodiment, the third predetermined engine speed is about 7,250 RPM.

The exhaust timing control valve is maintained in this retracted position until the engine speed is decreased to a fourth predetermined engine speed P4, in the illustrated embodiment this speed is about 3,500 RPM. At this engine speed, an exhaust timing control valve cleaning cycle may occur without seriously impairing engine performance. Accordingly, once the engine speed has dropped below this fourth predetermined speed, the control unit 114 initiates a cleaning cycle (S-11, S-12). This second cleaning cycle may be repeated upon every instance where the valve is in a retracted high-speed position and the speed subsequently drops below the fourth predetermined speed.

The exhaust timing control valve is then returned to a retracted position in which position the valve is maintained until the engine speed decreases below the start-up/shut down engine speed X. The low speed of the start-up/shut down speed X is preferably chosen such that it is only encountered during start-up and shutdown of the engine. Accordingly, once the engine speed is detected at this low speed, the control unit 114 ensures that the valves 80 are fully retracted and prepared for shutdown (S-14, S-15). The engine then stops (S-15), the control cycle terminates and the control unit 114 is deactivated. It should be noted that the control valve 80 may be opened following shutdown by allowing the condenser or a battery to power the drive motor, and possibly the control unit 114, even after the engine stops generating power.

In case of a subsequent acceleration following the deceleration below the fourth predetermined speed P4, the control map again controls an extending and retracting of the valve. For instance, the map controls the extending of the valve. Once the valve is extended and the engine speed exceeds the third predetermined engine speed, the valve is retracted in accordance with another mapped strategy.

Thus, in the illustrated embodiment, the following strategy is employed. The exhaust valve is initially in a retracted position. Once the engine speed exceeds a speed required to allow the generator to power the drive motor, the control unit, or both, the exhaust valve is moved to an extended position in accordance with a mapped control strategy. The exhaust valve is maintained in the extended position while the engine speed is within a low speed range. The minimum of the low speed range is defined as the speed at which the generator can power the drive motor, the control unit, or both. Once the engine speed exceeds the maximum of the low speed range, the control unit initiates the retraction of the exhaust valve according to a second mapped strategy. Once retracted, the exhaust valve is maintained in the retracted position until the engine speed drops into the low speed range again. If the engine speed drops so low that the engine speed indicates a shutdown of the engine is inevitable, the exhaust valve is maintained in the retracted position.

The exhaust valve is cleaned under two scenarios in the illustrated invention. First, on start-up, the first time the engine speed exceeds a predetermined speed, which may be less than idle, the exhaust valve is cycled through a cleaning cycle. Second, when the engine speed decreases from a high-speed range to a low speed range, the exhaust valve is cycled through a cleaning cycle if the speed falls below a second predetermined speed. The second predetermined speed may be greater than the first predetermined speed.

Although the present invention has been described in the context of an exemplary environment of a snowmobile, it is to be understood that the spirit of the invention is only to be interpreted in light of, and not to be limited by, the above-described embodiment. Accordingly, the scope of the present invention is intended to be limited only to the reasonable scope of the following claims and their equivalents:

What is claimed is:

1. A snowmobile comprising at least one ski and an engine driving a track, the engine having a crankshaft and a combustion chamber, an exhaust port leading from the combustion chamber for routing exhaust products therefrom and an exhaust valve cooperable with the exhaust port and movable between a first position for delaying the closing of the exhaust port and a second position for advancing the closing of the exhaust port, the snowmobile further comprising an electrical power source which generates power through a connection to the engine crankshaft, a control unit powered by the electrical power source and a drive control in communication with the control unit, the drive control capable of moving the exhaust valve at least partially between the first position and the second position, the control unit signaling the drive control to extend the valve from the first position to the second position if the engine has an engine speed within a predetermined range, and the control unit signaling the drive control to retract the valve from the second position to the first position if the engine speed is outside of the predetermined range, the predetermined range having a lower limit engine speed below which the electrical power source cannot generate sufficient energy the supply to power control unit.

2. The snowmobile of claim 1, wherein an energy storage cell is interposed between the electrical power source and the control unit.

3. The snowmobile of claim 1, wherein the energy storage cell is a condenser.

4. The snowmobile of claim 1, wherein the control unit initiates an exhaust valve cleaning cycle after the engine speed first exceeds a first predetermined speed within the predetermined range after engine start-up.

5. The snowmobile of claim 4, wherein the first predetermined speed is above an idle speed.

6. The snowmobile of claim 4, wherein the control unit initiates a cleaning cycle after the engine speed exceeds an upper limit engine speed of the predetermined range and then subsequently decreases below a second predetermined speed within the predetermined range during engine deceleration.

7. The snowmobile of claim 1, wherein the control unit initiates a cleaning cycle after the engine speed exceeds an upper limit engine speed of the predetermined range and then subsequently decreases below a second predetermined speed within the predetermined range during engine deceleration.

8. The snowmobile of claim 1, wherein the drive control is powered after the engine is shut off for a predetermined period of time to allow the exhaust valve to be moved to the first position.

9. A snowmobile comprising at least one ski and an engine driving a track, the engine having an output shaft, a combustion chamber, an exhaust port leading from the combustion chamber for routing exhaust products therefrom and an exhaust valve cooperable with the exhaust port and movable between a first position for delaying the closing of the exhaust portion and a second position for advancing the closing of the exhaust port, the engine further comprising a starter motor connected to the output shaft for starting the engine and an electrical power generator which is connected to the output shaft to generate electrical energy, the snowmobile also having a control unit, a drive control being in electrical communication with the control unit, the drive control and the control unit receiving power from the electrical power generator, the drive control capable of moving the exhaust valve at least partially between the first position and the second position, the control unit activating the drive control to cycling the exhaust valve between the first position and the second position in a cleaning operation before the engine attains a first predetermined speed, wherein the first predetermined speed is below an idle speed.

10. The snowmobile of claim 9, wherein the first predetermined speed is a speed at which the generator can begin to power the control unit.

11. The snowmobile of claim 10, wherein the drive control moves the exhaust valve from the first position to the second position when the engine attains a speed greater than that attainable by a starter motor.

12. The snowmobile of claim 9, wherein the control unit receives signals from an engine speed sensor.

13. The snowmobile of claim 9, wherein the control unit receives signals from an exhaust control valve position sensor.

* * * * *